US012736508B2

(12) United States Patent
Sakai

(10) Patent No.: US 12,736,508 B2
(45) Date of Patent: Sep. 15, 2026

(54) TRAINING DATA GENERATION APPARATUS, MODEL TRAINING APPARATUS, SAMPLE CHARACTERISTIC ESTIMATION APPARATUS, AND CHROMATOGRAPH MASS SPECTROMETRY APPARATUS

(71) Applicant: Shimadzu Corporation, Kyoto (JP)

(72) Inventor: Takero Sakai, Columbia, MD (US)

(73) Assignee: Shimadzu Corporation, Kyoto (JP)

( * ) Notice: Subject to any disclaimer, the term of this patent is extended or adjusted under 35 U.S.C. 154(b) by 1197 days.

(21) Appl. No.: 17/478,044

(22) Filed: Sep. 17, 2021

(65) Prior Publication Data

US 2022/0091078 A1 Mar. 24, 2022

(30) Foreign Application Priority Data

Sep. 23, 2020 (JP) ................................ 2020-158367

(51) Int. Cl.
*G01N 30/86* (2006.01)
*G01N 30/72* (2006.01)

(52) U.S. Cl.
CPC ..... *G01N 30/8693* (2013.01); *G01N 30/7206* (2013.01); *G01N 30/7233* (2013.01); *G01N 30/8631* (2013.01)

(58) Field of Classification Search
CPC ........... G01N 30/8693; G01N 30/7206; G01N 30/7233; G01N 30/8631
See application file for complete search history.

(56) References Cited

U.S. PATENT DOCUMENTS 9,520,277 B2 * 12/2016 Yamada ................ G16C 20/20
2002/0102610 A1 * 8/2002 Townsend ............. G16B 30/10 435/7.1
2007/0176088 A1 8/2007 Li
2008/0095428 A1 4/2008 Villmann et al.
2009/0042304 A1 * 2/2009 Anderson ............. G01N 33/02 436/20

(Continued)

FOREIGN PATENT DOCUMENTS

JP 2012-027683 A 2/2012
JP 2012027683 * 2/2012 ............ B21B 37/00

(Continued)

OTHER PUBLICATIONS

Application News, No. M276: Quality Classification of Foods Through Analysis by Machine Learning, Shimadzu, https://solutions.shimadzu.co.jp/cgi/ac?cmd=1&url=/solnavi/s/apl/a-news/1/m/pdf/m276.pdf (2019).

(Continued)

*Primary Examiner* — Catherine T. Rastovski
*Assistant Examiner* — Sharah Zaab
(74) *Attorney, Agent, or Firm* — Morgan, Lewis & Bockius LLP

(57) ABSTRACT

A processor performs processing for generating training data by processing a plurality of pieces of peak information obtained by a data obtaining unit. The processor deletes data on a peak missing in any of the plurality of pieces of peak information from each piece of peak information. When a coefficient of correlation of data between peaks among remaining peaks is equal to or larger than a prescribed value, the processor further deletes data on one peak of the peaks from each piece of peak information, and defines peak information including data on the remaining peaks as input data for data for learning.

5 Claims, 16 Drawing Sheets

(56) References Cited

U.S. PATENT DOCUMENTS

| | | | |
|---|---|---|---|
| 2010/0070438 A1 | 3/2010 | Sakakibara et al. | |
| 2016/0321561 A1 | 11/2016 | Roder et al. | |
| 2017/0059535 A1* | 3/2017 | Carrard | G01N 33/487 |
| 2017/0213000 A1 | 7/2017 | Ji et al. | |
| 2018/0348180 A1 | 12/2018 | Kitano | |
| 2019/0115197 A1 | 4/2019 | Minohata et al. | |
| 2019/0130994 A1* | 5/2019 | Ruderman | G16B 40/10 |

FOREIGN PATENT DOCUMENTS

| | | |
|---|---|---|
| JP | 6439878 B2 | 12/2018 |
| JP | 2019-074371 A | 5/2019 |

OTHER PUBLICATIONS

Office Action dated Sep. 26, 2023, issued in corresponding Japanese Patent Application No. 2020-158367.

Vega-Marquez et al., "Deep Learning Techniques to Improve the Performance of Olive Oil Classification," Frontiers in Chemistry, 7: Article 929 (2020).

Johnson et al., "Flavor-Cyber-Agriculture: Optimization of plant metabolites in an open-source control environment through surrogate modeling," PLoS One, 14 (4): e0213918 (2019).

Li et al., "Research on Distinguishing Fish Meal Quality Using Different Characteristic Parameters Based on Electronic Nose Technology," Sensors, 19: 2146 (2019).

Lebanov et al., "Random Forest machine learning applied to gas chromatography—Mass spectrometry derived average mass spectrum data sets for classification and characterisation of essential oils," Talanta (2019).

Application News, No. M282: Discovery of Markers from Chromatogram Data by Machine Learning, Shimadzu, https://solutions.shimadzu.co.jp/solnavi/n/apl/anews/m/m282.htm (2019).

Application News, No. M285: Determination of Geographical Origin of Agricultural Products by Smart Metabolites Database, https://solutions.shimadzu.co.jp/solnavi/n/apl/anews/m/m285.htm (2019).

Office Action dated Feb. 13, 2024, issued in corresponding Japanese Patent Application No. 2020-158367.

* cited by examiner

<FEATURE DATA MAP>

| DATA NAME | LABEL | RT1.32_001 | --- | RT22.52_199 | RT23.48_200 |
|---|---|---|---|---|---|
| Data001 | 0 | p1 | --- | p22969 | p23085 |
| Data002 | 0 | p2 | --- | p22970 | p23086 |
| Data003 | 0 | p3 | --- | p22971 | p23087 |
| Data004 | 0 | p4 | --- | p22972 | p23088 |
| Data005 | 0 | p5 | --- | p22973 | p23089 |
| ⋮ | ⋮ | ⋮ | ⋮ | ⋮ | ⋮ |
| Data115 | 1 | p115 | --- | p23083 | p23199 |
| Data116 | 1 | p116 | --- | p23084 | p23200 |

FIG.11
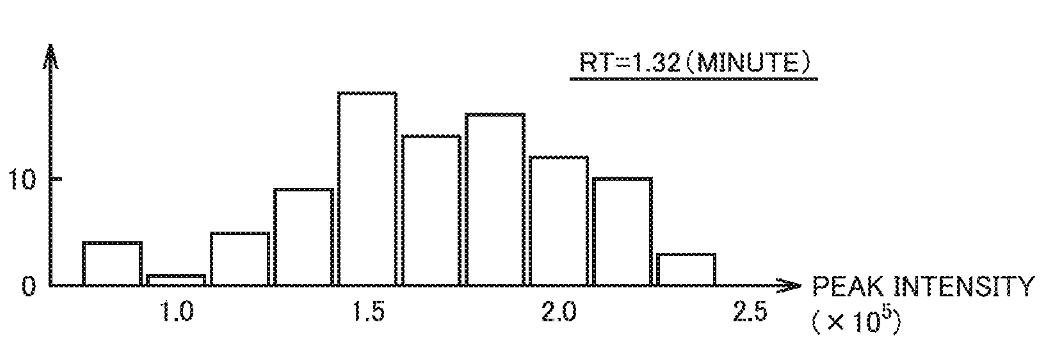
FIG.12
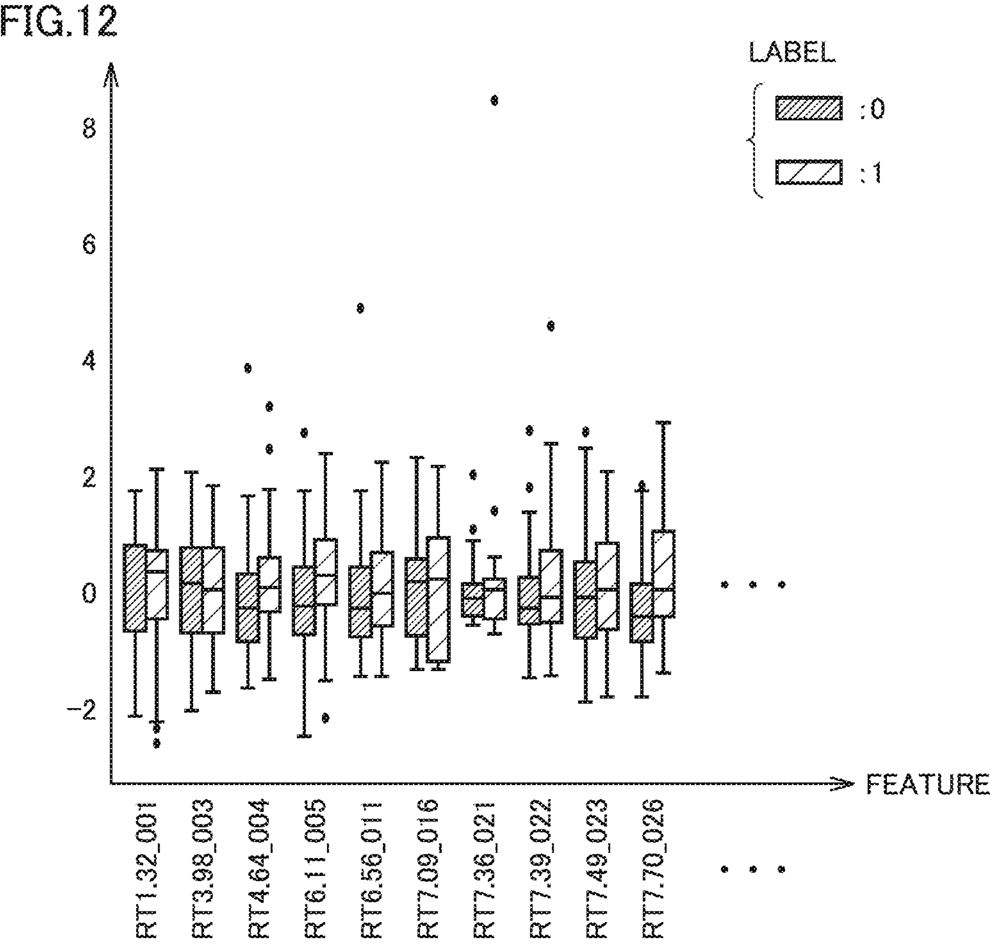

| PEAK | HIT COMPOUND IN LIBRARY SEARCH RESULT | VARIABLE |
|---|---|---|
| RT1.32_001 | Trimethylamine | x1 |
| RT3.98_003 | 2-hydroxypropanamide | x2 |
| RT7.39_022 | gamma.-n-Amylbutyrolactone | x3 |
| RT9.21_035 | Uric acid | x4 |
| RT9.40_039 | Lauryl acetate | x5 |
| RT12.46_083 | 9-Octadecen-1-ol | x6 |
| RT12.88_111 | Hexadecanamide | x7 |
| RT14.15_116 | Oleic Acid | x8 |
| RT16.73_139 | Benzyl icosanoate | x9 |
| RT19.56_155 | 5-Cholestene | x10 |

TRAINING DATA GENERATION APPARATUS, MODEL TRAINING APPARATUS, SAMPLE CHARACTERISTIC ESTIMATION APPARATUS, AND CHROMATOGRAPH MASS SPECTROMETRY APPARATUS

BACKGROUND OF THE INVENTION

Field of the Invention

The present disclosure relates to a training data generation apparatus, a model training apparatus, a sample characteristic estimation apparatus, and a chromatograph mass spectrometry apparatus.

Description of the Background Art

A system that analyzes with software, data obtained in various analysis apparatuses such as a gas chromatograph (GC), a liquid chromatograph (LC), a gas chromatograph mass spectrometer (GCMS), and a liquid chromatograph mass spectrometer (LCMS) has been known. For example, Japanese Patent Laying-Open No. 2019-74371 discloses a data analysis apparatus suitable for multicomponent simultaneous analysis in which a large number of components (compounds and elements) in a sample are simultaneously quantified with the GCMS.

A peak can be picked from peak information in a chromatogram obtained from an analysis apparatus such as a GCMS, and presence of a specific substance can be detected or various types of classification based on a detected peak can be made. With development of machine learning, in recent years, an approach to various types of classification of an unknown sample by using a trained model generated by training a model through machine learning processing in which peak information obtained from a plurality of samples is used as training data (data for learning) has been studied.

With this approach, a training dataset in which a value of each peak (feature) for each sample and a prescribed characteristic (for example, freshness or a geographical origin of food) for each sample are associated with each other is used to train a model through machine learning processing. Depending on contents of the training dataset, however, accuracy of the generated trained model and efficiency in training may be lowered.

SUMMARY OF THE INVENTION

The present disclosure was made to solve such a problem, and an object of the present disclosure is to generate training data with which accuracy of a generated trained model and efficiency in training can be improved in training of a model through machine learning processing with peak information obtained from a plurality of samples.

A training data generation apparatus according to the present disclosure is a training data generation apparatus to be used for generation of a training model. The training model is generated through machine learning processing from data in which peak information representing a result of mass spectrometry of a sample and characteristic information representing a prescribed characteristic of the sample are associated with each other. The training data generation apparatus includes an obtaining unit that obtains the peak information and the characteristic information for each sample from a plurality of samples and a processor that performs processing for generating training data by processing a plurality of pieces of peak information obtained by the obtaining unit. The processor deletes data on a peak missing in any of the plurality of pieces of peak information from each of the plurality of pieces of peak information, further deletes, when a coefficient of correlation of data between peaks among remaining peaks is equal to or larger than a prescribed value, data on one peak of the peaks from each of the plurality of pieces of peak information, and defines the peak information including data on the remaining peaks as input data for data for learning.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing a configuration of a training data generation apparatus according to an embodiment of the present disclosure.

FIG. 2 is a block diagram showing a configuration of a training apparatus that trains a model with training data generated by the training data generation apparatus shown in FIG. 1.

FIG. 9 is a diagram showing an exemplary feature data map generated in step S30 in FIG. 4 in Example 1.

FIG. 11 is a diagram showing an exemplary histogram for each feature calculated in step S60 in FIG. 4 in Example 1.

FIG. 12 is a diagram showing data scaled for each feature in a box-whisker plot for each label.

DESCRIPTION OF THE PREFERRED EMBODIMENTS

Figure 3:
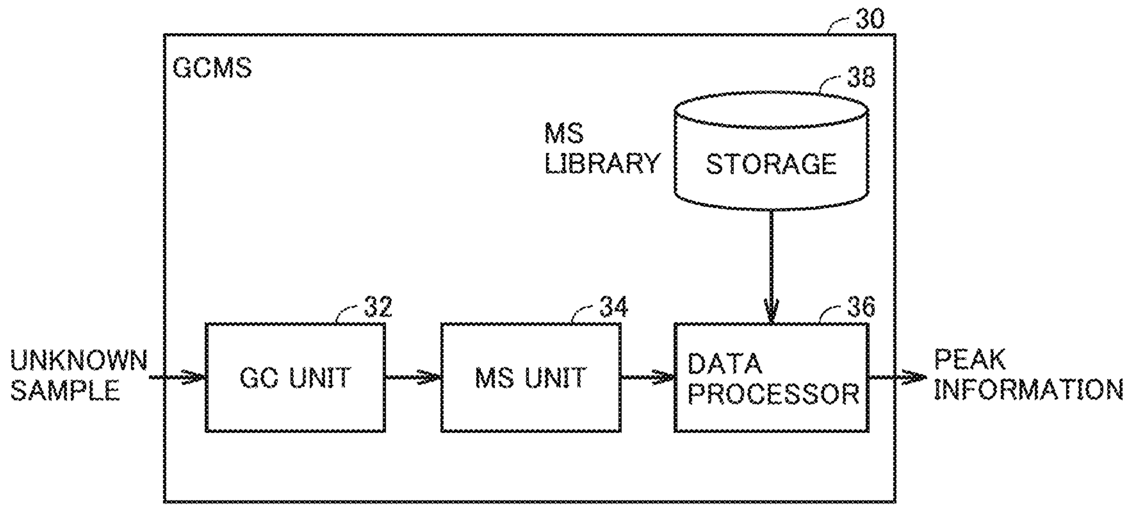
FIG. 3 is a block diagram showing a schematic configuration of a GCMS shown as an exemplary apparatus that generates peak information of a sample.

An embodiment of the present disclosure will be described in detail below with reference to the drawings. The same or corresponding elements in the drawings have the same reference characters allotted and description thereof will not be repeated.

Figures 1, 2:
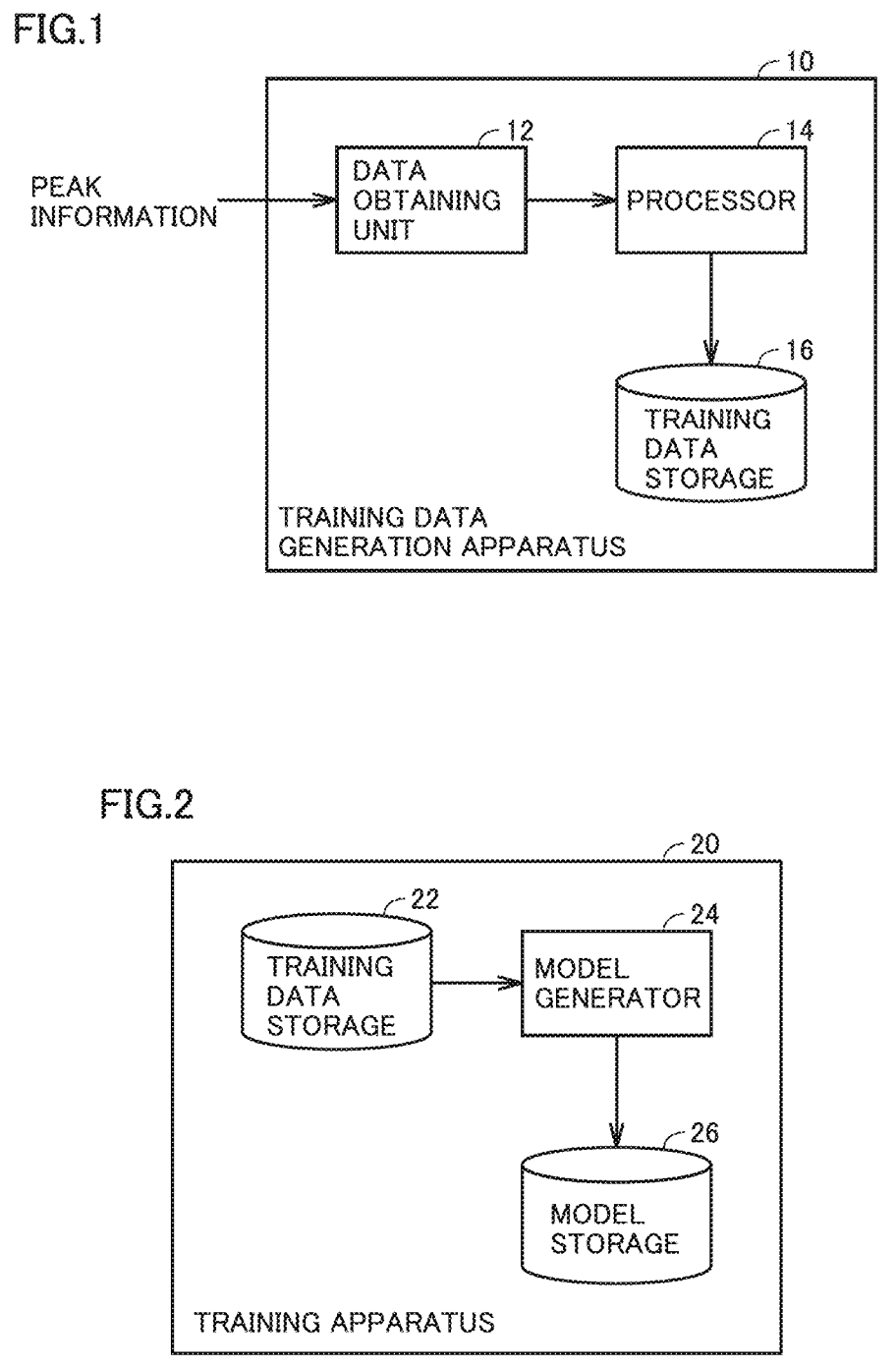

FIG. 1 is a block diagram showing a configuration of a training data generation apparatus according to an embodiment of the present disclosure. The present disclosure provides a training apparatus that trains a model through machine learning processing with training data in which peak information obtained from a GCMS or an LCMS and a prescribed characteristic of a sample (for example, freshness or a geographical origin of food) are associated with each other. The present disclosure provides an estimation apparatus that estimates a characteristic of an unknown sample obtained from the GCMS or the LCMS by entering peak information of the unknown sample into a trained model.

The training data generation apparatus shown in FIG. 1 is an apparatus that generates training data (data for learning) used for generation of a model in a training apparatus. Since training data greatly affects accuracy of a model generated by the training apparatus (accuracy in estimating a characteristic of an unknown sample), in the present embodiment, training data is generated by performing specific preprocessing (which will be described later) on peak information of a plurality of samples obtained for training of the model, and with that training data, the model is trained. In other words, the training data generation apparatus is an apparatus that performs preprocessing for generating training data from peak information of a plurality of samples.

Referring to FIG. 1, a training data generation apparatus 10 includes a data obtaining unit 12, a processor 14, and a training data storage 16. Data obtaining unit 12 obtains peak information of a plurality of samples to be used for training a model. In the present embodiment, for a plurality of samples, peak information for each sample and a characteristic of the corresponding sample are obtained in a set.

Peak information is peak data of a chromatogram obtained from a GCMS or an LCMS. The peak information may be peak data resulting from peak separation by software waveform processing such as deconvolution. Characteristics of the sample include, for example, whether or not freshness of food has deteriorated (Example 1 which will be described) or whether or not food is of a domestic or foreign origin (Example 2 which will be described later). The characteristics of the sample are not necessarily limited as such.

Processor 14 includes a central processing unit (CPU), a read only memory (ROM), and a random access memory (RAM) (none of which is shown). The CPU executes a program stored in the ROM by developing the program on the RAM or the like. A program stored in the ROM is a program in which a procedure of processing by processor 14 is described. Processor 14 performs processing shown below in accordance with such a program.

Processor 14 performs processing (preprocessing) for generating training data to be used in the training apparatus by processing peak information for each sample obtained by data obtaining unit 12. Specifically, in the present embodiment, processor 14 performs processing shown in (1) to (5) below on peak information for each sample obtained by data obtaining unit 12.

(1) Deletion, when data (a feature value) on peak intensity of one peak (feature) is missing in at least one sample, of the data (the feature value) on that peak (feature) from all samples (missing value processing)

When training data includes a missing value (a feature value being 0), a model training algorithm may be restricted or accuracy in training of the model may be lowered. For example, in Random Forest using a decision tree, a model can be generated even though training data includes a missing value. In logistic regression, however, when training data includes a missing value, modeling cannot be performed. Though an approach to compensation for a missing value when the training data includes a missing value is also available, reliability of data may be lowered or accuracy of the model may be lowered.

Then, in training data generation apparatus 10 according to the present embodiment, when data on peak intensity of one peak is missing in any sample, the data on that peak is deleted from all samples. In other words, in this missing value processing, what is called listwise deletion processing is performed. Various training models can thus be adopted to achieve highly accurate learning. Whether or not a peak is missing is determined, for example, based on whether or not peak intensity is lower than a prescribed threshold value.

(2) Generation of a feature data map in which peak intensities (feature values) at remaining peaks (features) and information (label) representing characteristics of samples are shown in a table for each sample obtained by data obtaining unit 12

For example, when data obtaining unit 12 obtains data on N samples and there are M remaining peaks after missing value processing, with addition of characteristic information (freshness or a geographical origin of food) for each sample, a feature data map having a size of N×(M+1) is generated. The missing value processing in (1) may be performed after the feature data map is generated.

(3) Deletion from a feature data map, of data on one of peaks (features) between which correlation is observed (correlation processing)

When features are strongly correlated with each other, a problem of multicollinearity occurs. If those features are used for training data, accuracy of a model may be lowered. Therefore, in the present embodiment, data on one peak of peaks is deleted, a coefficient of correlation between the peaks being equal to or larger than a threshold value (for example, 0.8). This threshold value may be modified depending on a correct answer rate (accuracy) of a generated model. For example, when the correct answer rate is low, the threshold value may be made smaller. Correlation between the features can thus further be lowered and improvement in correct answer rate of the model can be expected.

(4) Further deletion from the feature data map, of data on the peak (feature) with an outlier in distribution of peak intensity (feature value) for each peak (outlier processing)

Exceptional data such as an outlier may also lower accuracy of a model, if it is used for training data. Therefore, in the present embodiment, a peak with an outlier is also deleted. Whether or not data falls under an outlier is determined, for example, based on whether or not a difference from a statistical median exceeds a prescribed threshold value. In that case, the threshold value may be modified in accordance with a correct answer rate (accuracy) of a generated model. For example, when the correct answer rate is low, the threshold value may be made smaller. This processing does not have to be performed.

(5) Storing in training data storage 16, training data in which (i) each peak (feature) that remains in the feature data map and peak intensity (feature value) at each peak for each sample are defined as input data and (ii) characteristic information (label) for each sample is defined as correct answer data Accuracy of a training model can be improved by machine learning with training data subjected to such preprocessing being employed as data for learning.

Training data generated by processor 14 is stored in training data storage 16. As will be described later, a training apparatus which will be described later trains a model by using training data stored in training data storage 16 as data for learning. Training data storage 16 is implemented, for example, by a storage apparatus such as a hard disk drive (HDD) or a solid state drive (SSD).

FIG. 2 is a block diagram showing a configuration of a training apparatus that trains a model with training data generated by training data generation apparatus 10 shown in FIG. 1. Referring to FIG. 2, a training apparatus 20 includes a training data storage 22, a model generator 24, and a model storage 26.

Training data generated in training data generation apparatus 10 is stored in training data storage 22. Training data storage 22 is implemented, for example, by a storage apparatus such as an HDD or an SSD. When training data generation apparatus 10 and training apparatus 20 are implemented on an identical computer, training data storage 16 may be employed as training data storage 22.

Model generator 24 includes a CPU, a ROM, and a RAM (none of which is shown). A program stored in the ROM is a program in which a procedure of processing in model generator 24 is described. Model generator 24 performs processing shown below in accordance with the program.

Model generator 24 obtains training data from training data storage 22. Training data is a dataset in which a plurality of peaks (features) and peak intensity (a feature value) at each peak for each sample are defined as input data and characteristic information (label) for each sample is defined as correct answer data. Then, model generator 24 generates a training model by performing machine learning processing with the use of the obtained training data.

Various supervised learning algorithms can be adopted for the training algorithm. In Example 1 which will be described later, a logistic regression training algorithm is adopted, and in Example 2 which will be described later, a Random Forest training algorithm is adopted. The training algorithm is not limited as such, and for example, a deep learning algorithm using a neural network or a support vector machine (SVM) algorithm can also be adopted.

A trained model generated by model generator 24 is stored in model storage 26. As will be described later, with the trained model stored in model storage 26, an estimation apparatus which will be described later can estimate a characteristic (freshness or a geographical origin of food) of an unknown sample. Model storage 26 is also implemented, for example, by a storage apparatus such as an HDD or an SSD.

FIG. 3 is a block diagram showing a schematic configuration of a GCMS shown as an exemplary apparatus that generates peak information of a sample. Referring to FIG. 3, a GCMS 30 includes a GC unit 32, a mass spectrometer (MS) unit 34, a data processor 36, and a storage 38.

GC unit 32 separates a mixture sample to be analyzed for each component (compound) (chromatographic separation). GC unit 32 includes, for example, a gas supply apparatus that supplies carrier gas (a mobile phase), a sample vaporization chamber for vaporizing a sample by heating, and a column for separating a sample for each compound (none of which is shown). Compounds each having a retention time (RT) specific thereto and peak intensity (a peak height or a peak area) in accordance with a content thereof in a sample are successively provided from GC unit 32 (peak columns in a chromatograph).

MS unit 34 performs mass spectrometry on the compounds successively provided from GC unit 32. MS unit 34 includes, for example, an ion source that ionizes a compound provided from GC unit 32, a mass spectrometer that carries out mass separation in accordance with a ratio m/z between a mass m and charges z of the ionized compound, and a detector that detects ions provided from a mass spectrometer (none of which is shown). Various ion sources can be employed, and for example, an electron ionization (EI) ion source, a positive chemical ionization (PCI) ion source, and a negative chemical ionization (NCI) ion source can be adopted. A quadrupole (QP) mass spectrometer is representatively employed for the mass spectrometer. A secondary electron multiplier is representatively employed for the detector.

Data processor 36 performs identification processing for identifying a compound based on a retention time for each compound detected by GC unit 32 and a mass spectrum obtained as a result of mass spectrometry by MS unit 34. Specifically, data processor 36 obtains an MS library containing mass spectra of a large number of compounds from storage 38 and identifies a compound based on the retention time and the mass spectrum obtained by GC unit 32 and MS unit 34 by referring to the MS library. Data processor 36 performs quantification processing for quantifying the identified compound by calculating peak intensity in a mass chromatogram corresponding to the compound. The retention time and the peak intensity of each compound thus identified and quantified are obtained as peak information of a sample to be analyzed.

Figure 4:
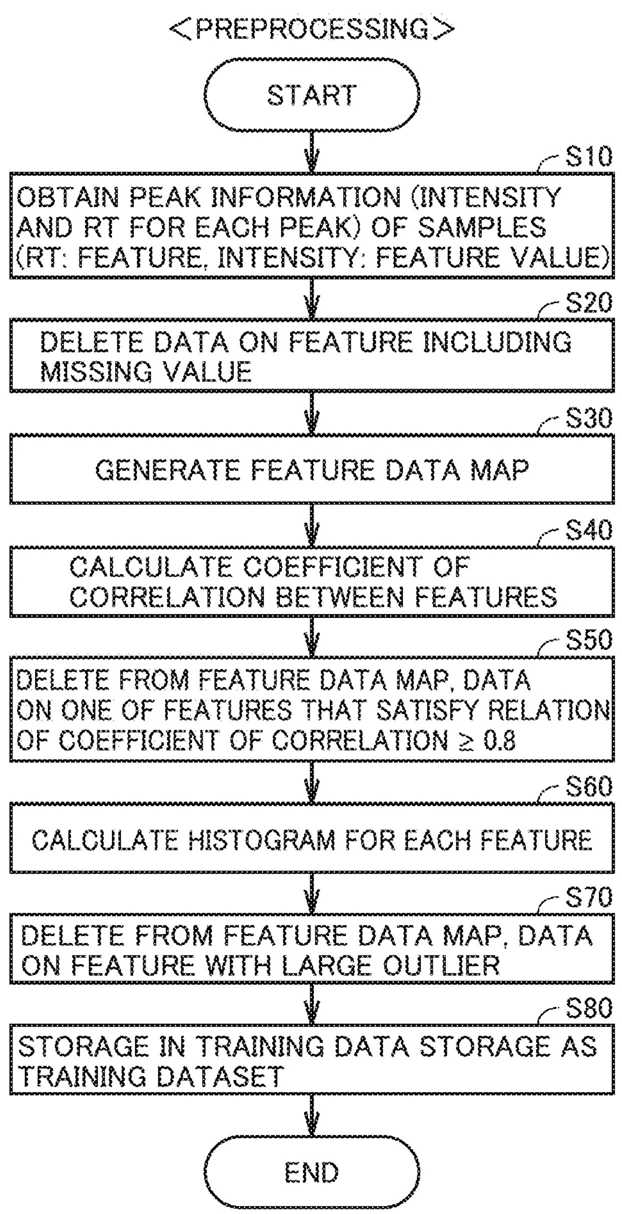
FIG. 4 is a flowchart showing an exemplary procedure in preprocessing (pretreatment) performed in the training data generation apparatus shown in FIG. 1.

FIG. 4 is a flowchart showing an exemplary procedure in preprocessing performed in training data generation apparatus 10 shown in FIG. 1. Referring to FIG. 1 together with FIG. 4, for a plurality of samples, processor 14 of training data generation apparatus 10 receives from data obtaining unit 12, peak information for each sample (intensity and a retention time (RT) for each peak) obtained by data obtaining unit 12 (step S10). The retention time (RT) in the peak information corresponds to a "feature" characterizing a sample to be analyzed and the peak intensity corresponds to data on the feature.

Then, regarding peak information for each obtained sample, when data on the peak intensity of any sample is missing at one peak, processor 14 deletes data on that peak from peak information of all samples (step S20). In other words, processor 14 deletes data on the peak (feature) including the missing value, while maintaining data on the peaks (features) that are not missing in all obtained pieces of peak information. When training data includes a missing value (a feature value is 0), the model training algorithm may be restricted or accuracy in training of the model may be lowered. Therefore, data on the feature including the missing value is deleted.

Then, processor 14 generates a feature data map in which peak intensity for each sample at each remaining peak (feature) and characteristic information (label) are shown in a table for a plurality of obtained samples (step S30). In other words, the feature data map is a summary in a form of a table for a plurality of samples, of intensity (feature data) for each sample at each remaining peak (feature) as a result of processing in step S20 and the characteristic information (label).

In succession, by referring to the feature data map, processor 14 calculates a coefficient of correlation between peaks for all peaks (features) in a round-robin manner (step S40). Then, processor 14 deletes data on one of peaks a coefficient of correlation between which is, for example, equal to or larger than 0.8 (step S50). This is done in order to eliminate multicollinearity caused when the coefficient of correlation between features is large and to suppress lowering in accuracy in training.

Then, processor 14 calculates for each peak (feature), a histogram of peak intensity (feature data) of each sample (step S60). Then, processor 14 further deletes data on a peak with an outlier from the feature data map (step S70). For example, when data on one peak is shown in a box-whisker plot, data further distant by a prescribed amount from a lower end of a whisker (a first quartile−1.5×IQR (quartile range)) or an upper end of the whisker (a third quartile+1.5×IQR) is defined as an outlier, and data on the peak with the outlier is deleted. Alternatively, data a difference of which from a statistical median exceeds a prescribed threshold value may be defined as an outlier.

Then, processor 14 has data in the feature data map resulting from processing in step S70 stored in training data storage 16 as a training dataset (step S80). As set forth above, training data free from missing data or an outlier in which peaks (features) are independent of each other can be prepared as the training dataset. Accuracy of a training model can be improved by machine learning with training apparatus 20 with the use of training data subjected to such preprocessing as data for learning.

Figure 5:
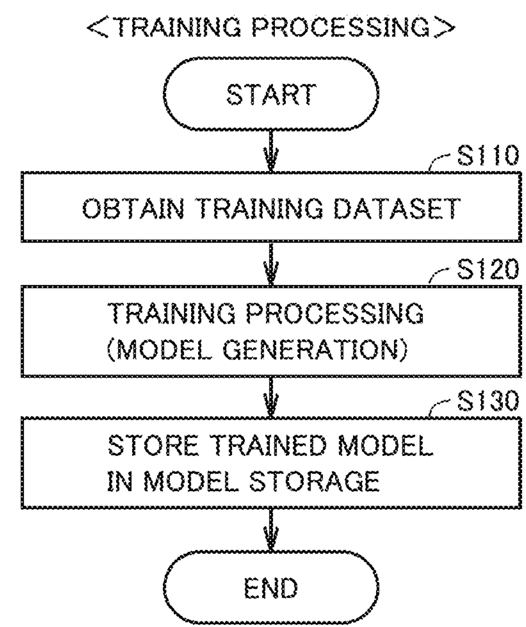
FIG. 5 is a flowchart showing an exemplary procedure in training processing performed in the training apparatus shown in FIG. 2.

FIG. 5 is a flowchart showing an exemplary procedure in training processing performed in training apparatus 20 shown in FIG. 2. Referring to FIG. 2 together with FIG. 5, model generator 24 of training apparatus 20 obtains the training dataset generated by training data generation apparatus 10 (FIG. 1) from training data storage 22 (step S110).

The training dataset is a dataset in which, for a plurality of samples, a plurality of peaks (features) extracted in the preprocessing above and peak intensity (feature data) for each sample at each peak are defined as input data and characteristic information (label) for each sample is defined as correct answer data.

Then, model generator 24 generates a training model by performing machine learning processing with the input data and the correct answer data included in the obtained training dataset as data for learning (step S120). As described above, various supervised learning algorithms can be used for this machine learning processing.

Then, model generator 24 has the model generated by model generator 24 stored in model storage 26 as what is called a "trained model" (step S130).

The trained model generated as above is used for estimating a characteristic of an unknown sample.

Figure 6:
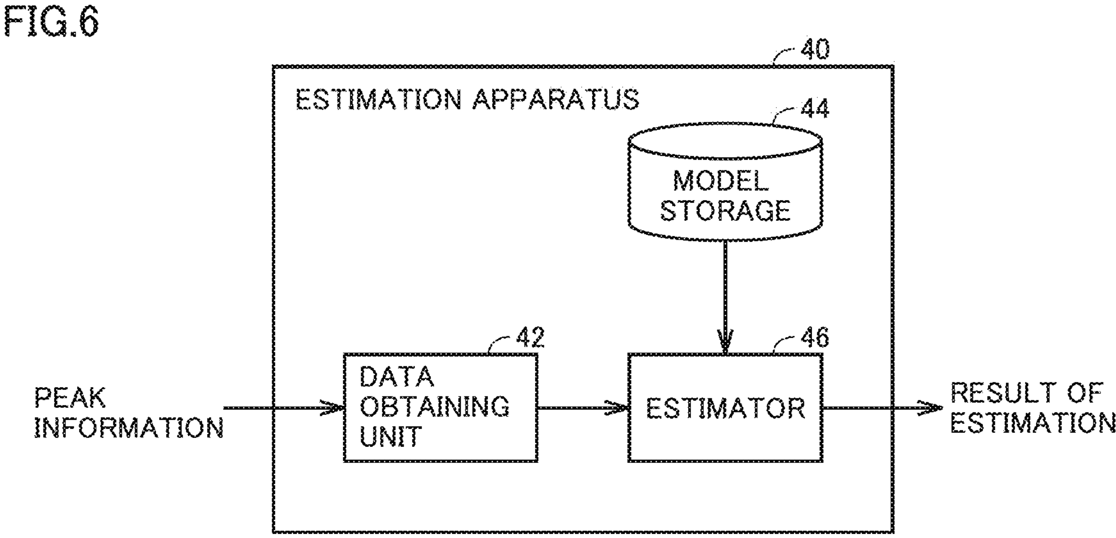
FIG. 6 is a block diagram showing a configuration of an estimation apparatus according to the present embodiment.

FIG. 6 is a block diagram showing a configuration of an estimation apparatus according to the present embodiment. Referring to FIG. 6, this estimation apparatus estimates a characteristic of an unknown sample obtained from GCMS 30 by entering peak information of that unknown sample into the trained model generated by training apparatus 20.

Referring to FIG. 6, an estimation apparatus 40 includes a data obtaining unit 42, a model storage 44, and an estimator 46. Data obtaining unit 42 obtains peak information on an unknown sample to be examined. In the present embodiment, GCMS 30 shown in FIG. 3 performs mass spectrometry on the unknown sample, and peak information representing a result of mass spectrometry is obtained from GCMS 30.

The trained model generated by training apparatus 20 (FIG. 2) is stored in model storage 44. Model storage 44 is implemented, for example, by a storage apparatus such as an HDD or an SSD. When training apparatus 20 and estimation apparatus 40 are implemented on an identical computer, model storage 26 (FIG. 2) may be employed as model storage 44.

Estimator 46 includes a CPU, a ROM, and a RAM (none of which is shown). A program stored in the ROM is a program in which a procedure of processing by estimator 46 is described. Estimator 46 performs processing shown below in accordance with such a program.

Specifically, estimator 46 receives from data obtaining unit 42, peak information of an unknown sample obtained by data obtaining unit 42. Estimator 46 obtains the trained model from model storage 44. Then, estimator 46 estimates a characteristic of the unknown sample by entering into the trained model, the peak information of the unknown sample received from data obtaining unit 42. In other words, estimator 46 estimates the characteristic of the unknown sample obtained by data obtaining unit 42 by using the trained model trained by training apparatus 20.

Figure 7:
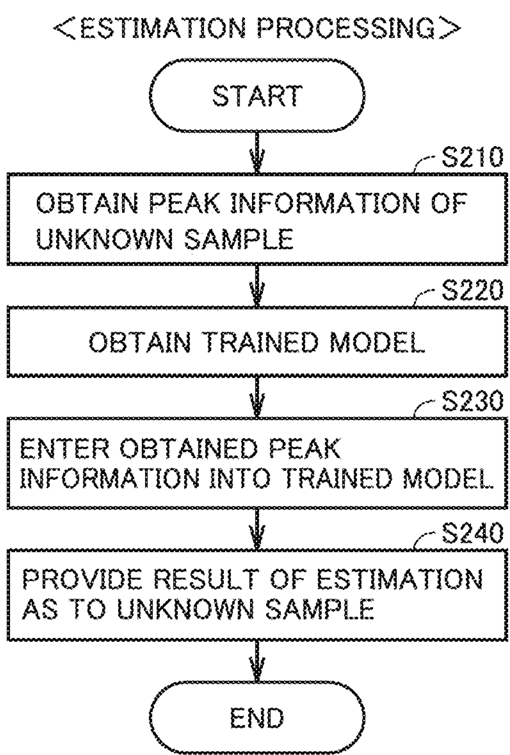
FIG. 7 is a flowchart showing an exemplary procedure in estimation processing performed in the estimation apparatus shown in FIG. 6.

FIG. 7 is a flowchart showing an exemplary procedure in estimation processing performed in estimation apparatus 40 shown in FIG. 6. Referring to FIG. 6 together with FIG. 7, estimator 46 of estimation apparatus 40 receives from data obtaining unit 42, peak information (the retention time (RT) and peak intensity for each peak) of an unknown sample obtained by data obtaining unit 42 (step S210). Estimator 46 obtains the trained model from model storage 44 (step S220).

Then, estimator 46 enters into the trained model, data on the peak (data on the peak included in the training dataset) extracted in training data generation apparatus 10 (FIG. 1) among the peaks (features) included in the peak information of the unknown sample obtained in step S210 (step S230). Then, estimator 46 provides output from the trained model as a result of estimation of the characteristic of the unknown sample (step S240).

As set forth above, according to this embodiment, training data from which data on an unnecessary peak (feature) has been deleted is generated so that accuracy of the generated trained model is improved and efficiency in training of the model is also improved.

EXAMPLE 1

An Example of discovery of discriminant markers for determining freshness of food from GCMS data of food samples will be described.

In this example, a dataset for beef was used as a food sample. Samples were prepared using red meat from various cuts of beef; properly refrigerated samples (stored, for example, at 4° C. and referred to as "4° C. samples" below) and samples (referred to as "40° C. samples" below) expected to exhibit deterioration due to exposure to a 40° C.

environment for three hours. These samples were indistinguishable from each other from appearance of the samples.

Twenty milligrams of each sample were taken and placed in individual measurement vials, and 116 vials in total including fifty-eight 4° C. samples and fifty-eight 40° C. samples were prepared. The composition of gas generated when the samples were heated to 200° C. was analyzed by the solid phase micro extraction (SPME) method.

Figure 8:
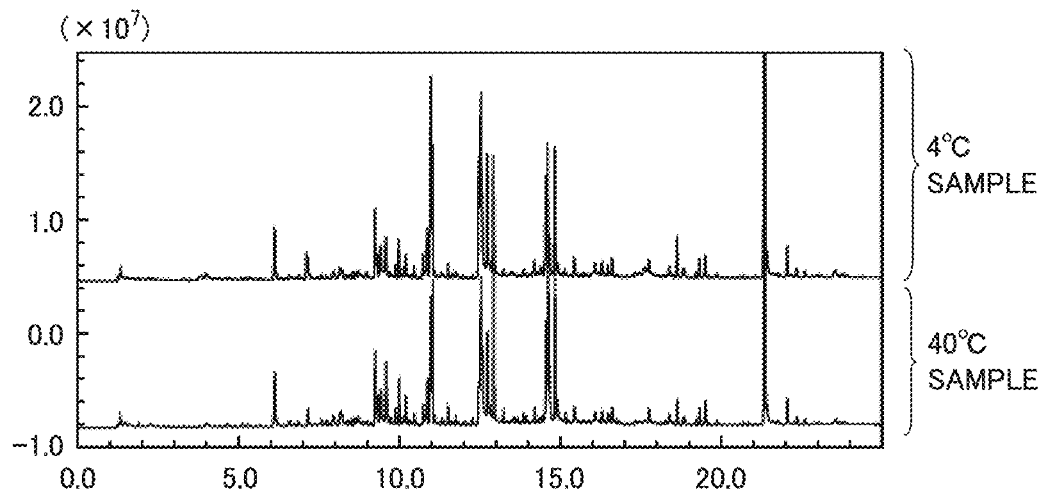
FIG. 8 is a diagram showing an exemplary chromatogram obtained as a result of analysis with an SPME method.

FIG. 8 is a diagram showing an exemplary total ion chromatogram (TIC) obtained as a result of analysis with the SPME method. Referring to FIG. 8, the 4° C. sample and the 40° C. sample were indistinguishable from each other from the appearance of the chromatogram.

Picking/alignment of the deconvolution/peaks of chromatogram data were done using commercially available analysis software. In this Example 1, peak heights were output as data, as this data is relatively unaffected by waveform processing. Because the dataset for all samples was extremely wide including 116 samples×9318 peaks (features), a training dataset from which unnecessary peaks (features) had been reduced was generated by performing preprocessing (FIG. 4) on this initial dataset with the use of training data generation apparatus 10 (FIG. 1) described in the embodiment above. Preprocessing on the dataset in present Example 1 will be described in detail below.

Referring again to FIG. 4, as a result of deletion of data on a peak including a missing value in step S20, the number of peaks (features) was reduced to two hundred.

FIG. 9 is a diagram showing an exemplary feature data map generated in step S30 in FIG. 4 in present Example 1. Referring to FIG. 9, a "data name" is a name provided for each sample. A "label" is data showing whether each sample is either a 4° C. sample or a 40° C. sample; "1" represents a 4° C. sample and "0" represents a 40° C. sample. This label data is used as correct answer data for training data.

"RT1.32_001" or the like represents a peak as a feature. For example, in "RT1.32_001", "RT1.32" represents data on a peak of the retention time (RT) of 1.32 minute and "001" is a serial number provided for each peak. Therefore, "RT22.52_199" represents data on a peak (a serial number 199) of the retention time (RT) of 22.52 minutes and "RT23.48_200" represents data on a peak (a serial number 200) of the retention time (RT) of 23.48 minutes. Each piece of data (feature data) represents a peak height as described above.

In present Example 1, these 116 pieces of data were divided into 92 pieces of training data and 24 pieces of test data, a model was trained with the training data, and a trained model was evaluated by using the test data. Division was done using Stratified Shuffle Split so as to avoid skewing of the label data.

Figure 10:
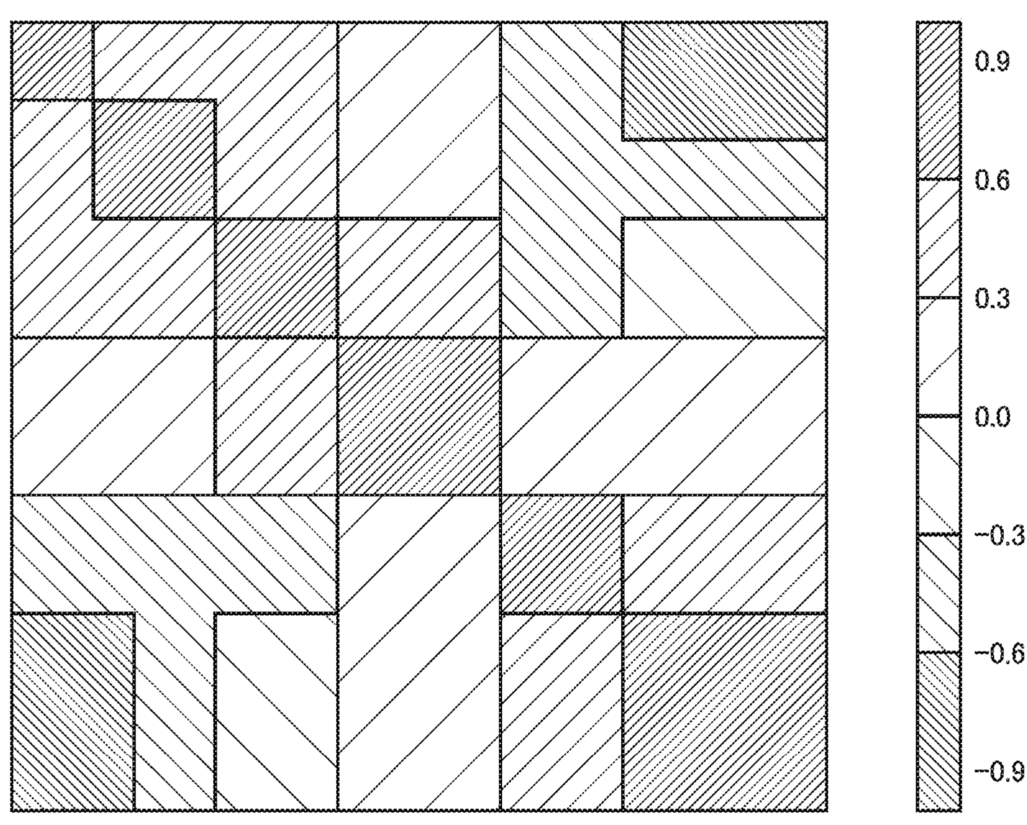
FIG. 10 is a diagram showing an exemplary heatmap of a correlation coefficient matrix showing a coefficient of correlation between features calculated in step S40 in FIG. 4 in Example 1.

FIG. 10 shows an image of a heatmap of a correlation coefficient matrix showing a coefficient of correlation between features calculated in step S40 in FIG. 4 in present Example 1. Referring to FIG. 10, data are aligned in the order of the retention time in vertical and lateral directions from upper left or from lower right of the figure, and a coefficient of correlation between peaks is shown in matrix. Though there are actually 200×200 rows and columns, the image of the heatmap is shown for the sake of illustration.

A dark portion shows that the coefficient of correlation is high. It can be seen in the figure that peaks with similar retention times include many combinations with high correlation coefficients.

Referring again to FIG. 4, in present Example 1, data on one of peaks a coefficient of correlation between which was 0.8 or higher was deleted in step S50, and consequently, the number of peaks (features) was reduced to thirty.

FIG. 11 is a diagram showing an exemplary histogram for each feature calculated in step S60 in FIG. 4 in present Example 1. Referring to FIG. 11, by way of example, a histogram of data on a peak (data on "RT1.32_001" in the feature data map in FIG. 9) of the retention time (RT) of 1.32 minute is shown. Data on a peak with a large outlier or a peak significantly narrow in extent of distribution may be deleted at this stage.

FIG. 12 is a diagram showing data scaled for each feature in a box-whisker plot for each label. Referring to FIG. 12, data greatly distant from the lower end or the upper end of the whisker or data a difference of which from a median exceeds a threshold value may be defined as an outlier, and data on the peak with the outlier may be deleted. Alternatively, data on a peak significantly narrow in extent of distribution may be deleted.

In this box-whisker plot, a peak different in distribution of data for each label can be a principal feature for proper classification of a sample.

In present Example 1, no peak (feature) was deleted at this stage, and a model was once created from data on thirty peaks. When the correct answer rate of the created model is low, data on the peak with the outlier may be deleted. Alternatively, when the correct answer rate of the model is low, a threshold value on which determination as to the outlier is based may be made smaller, or a threshold value may automatically be set in accordance with the correct answer rate.

Figure 13:
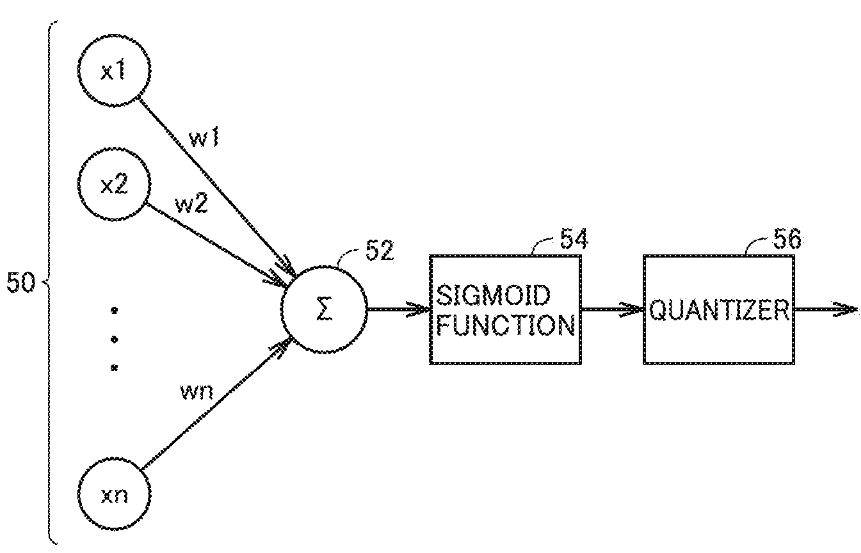
FIG. 13 is a diagram showing an exemplary logistic regression model.

An object is to discover marker compounds with a high contribution to target classification by a binary discriminant model for the 4° C. and 40° C. samples. Therefore, in this example, a logistic regression type training algorithm was adopted. FIG. 13 is a diagram showing an exemplary logistic regression model.

Referring to FIG. 13, data on n features are provided to x1 to xn input layers 50. Input values from input layer 50 were multiplied by respective weights w1 to wn and added in an addition layer 52. An output from addition layer 52 is provided to a sigmoid function 54, and weights w1 to wn are trained with a gradient descent method based on an output from sigmoid function 54. A quantizer 56 binarizes the output from sigmoid function 54 and provides a result as an output.

According to such logistic regression, an absolute value of a coefficient (weight) of each feature can be considered as magnitude of contribution. Though not particularly shown, as a result of evaluation of the trained model created at this stage by using the test data, sample classification accuracy was approximately 75%. Then, in present Example 1, in order to further reduce features with higher contributions to sample classification, Permutation Importance was adopted in terms of its higher generality.

Figure 14:
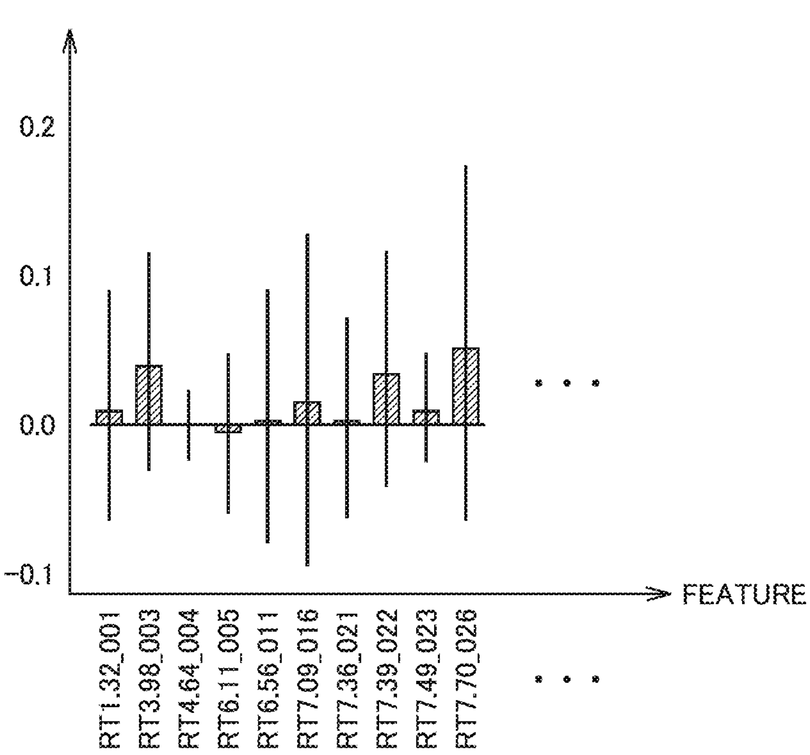
FIG. 14 is a diagram showing a value of Permutation Importance of each feature.

FIG. 14 is a diagram showing a value of Permutation Importance of each feature. Referring to FIG. 14, since the number of samples is relatively small at this time, significant variation may be likely by trial of splitting within training data. Then, in present Example 1, several split patterns were tried, and their average value was taken. Although the standard deviation was consequently large as illustrated, it was possible to grasp the overall trend. Based on this result, in present Example 1, ten features shown below were finally selected.

Figures 15, 16:
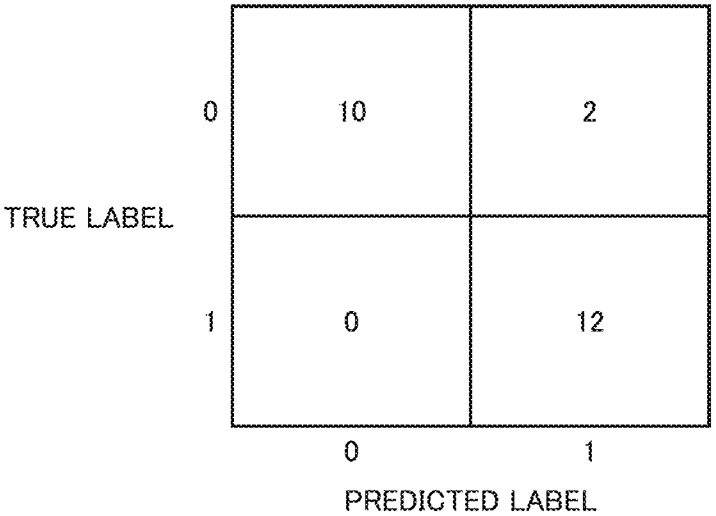
FIG. 15 is a diagram showing a selected peak and a result of library search for a corresponding compound.
FIG. 16 is a diagram showing a confusion matrix showing a result of evaluation of a trained model created in Example 1.

FIG. 15 is a diagram showing a selected peak and a result of library search for a corresponding compound. Referring to FIG. 15, since GCMS scan data are used here, qualitative analysis of the marker compounds can be conducted on each peak of ten selected features by using library search and reference standards.

A model was generated again by using data on features reduced to ten. As a result of evaluation of the finally generated trained model with the use of the test data, classification with precision of 91.67% was achieved. FIG. 16 shows a confusion matrix showing the result of evaluation of the generated trained model.

EXAMPLE 2

An application to determination of a geographical origin of an agricultural product is shown in Example 2. Mislabeling of the geographical origin of agricultural products is a universal problem in the agricultural and food product industries, and various techniques for determination of the geographical origin have been developed. Since determination of the geographical origin based on genetic information and other bioinformation possessed innately by agricultural products is generally difficult, information on substances acquired in agricultural products is used. In this type of determination, techniques based on information of elements introduced in agricultural products from external sources have excellent stability and have been used in research for many years.

In addition to substances introduced from external sources, the substances acquired in agricultural products also include substances that are produced internally, such as amino acids, organic acids, fatty acids, and sugar. These substances collectively called "metabolites" are contained in common in many agricultural products, and their concentration is thought to change dynamically at timing determined by the surrounding environment even in the same type of agricultural product. Therefore, if it is possible to discover patterns in abundance ratio of the metabolites in a designated type of agricultural product in various geographic regions by comprehensive measurement of the metabolites in that agricultural product, it should be possible to use those patterns to determine the geographical origin of products.

In this Example 2, the metabolites in 106 samples in total of domestically produced asparagus and asparagus produced in other countries were measured using Shimadzu Smart Metabolites Database™, which enables simultaneous measurement of compositions of 337 hydrophilic metabolites, and a model (trained model) for determination as to domestic or foreign origin was prepared by machine learning processing.

The prepared asparagus samples included fifty-eight domestic samples and forty-eight samples of foreign origin. Asparagus cut to a suitable size was reduced and freeze-dried, and thereafter the samples were powdered. The obtained powders were then extracted and derivatized by a preprocessing protocol based on the Bligh & Dyer method. The internal standard to be added to the sample was Ribitol. After derivatization, sample solutions were measured by GCMS/MS. Analytical conditions conformed to those in Smart Metabolites Database.

Then, peak detection work was done using Shimadzu analysis software LabSolutions Insight™. The following rules were set for peak detection.

Rule 1: Compounds for which quantitation transition and confirmation transition form peaks simultaneously within the retention time of ±0.08 minute predicted from a retention index and a height of quantitation ions is 1000 or more are judged as "detected".

Rule 2: Even when several pieces of data do not satisfy Rule 1, compounds judged as "detected" in at least half the data are considered as "detected" if they resemble a peak close to the predicted retention time (in order to avoid cases where "undetected" data become a missing value or 0).

Rule 3: When there are two or more peaks that should be judged as "detected" near the predicted retention time, basically, the closer peak is considered as "detected". If this differs depending on the sample, however, the peak judged as "detected" in at least half the samples is considered as "detected" (in order to avoid cases where peaks that differ depending on the sample are considered as "detected").

Figure 17:
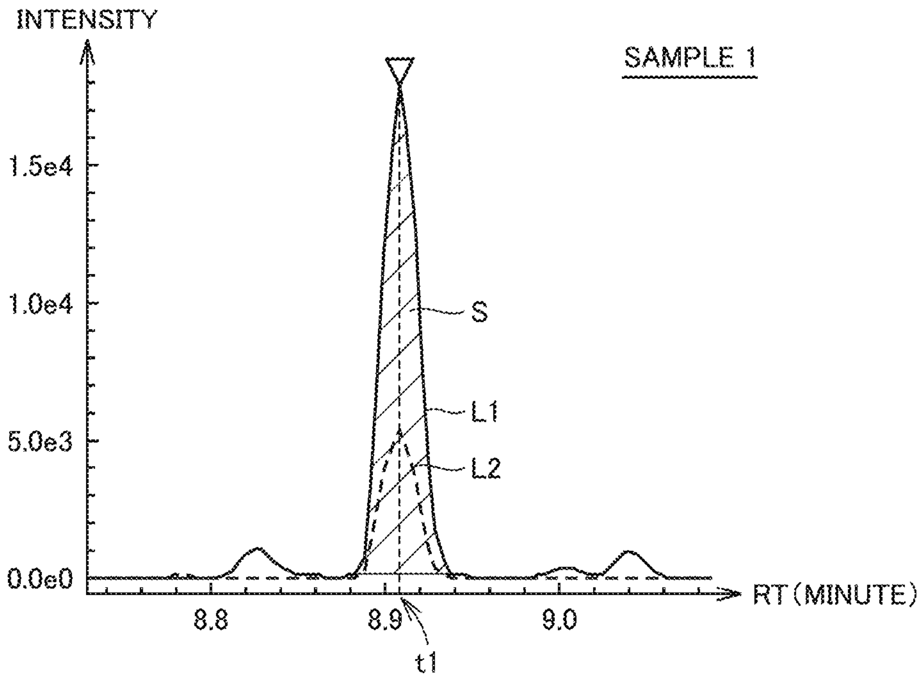
FIG. 17 is a first diagram for illustrating Rule 1 and Rule 2.
Figure 18:
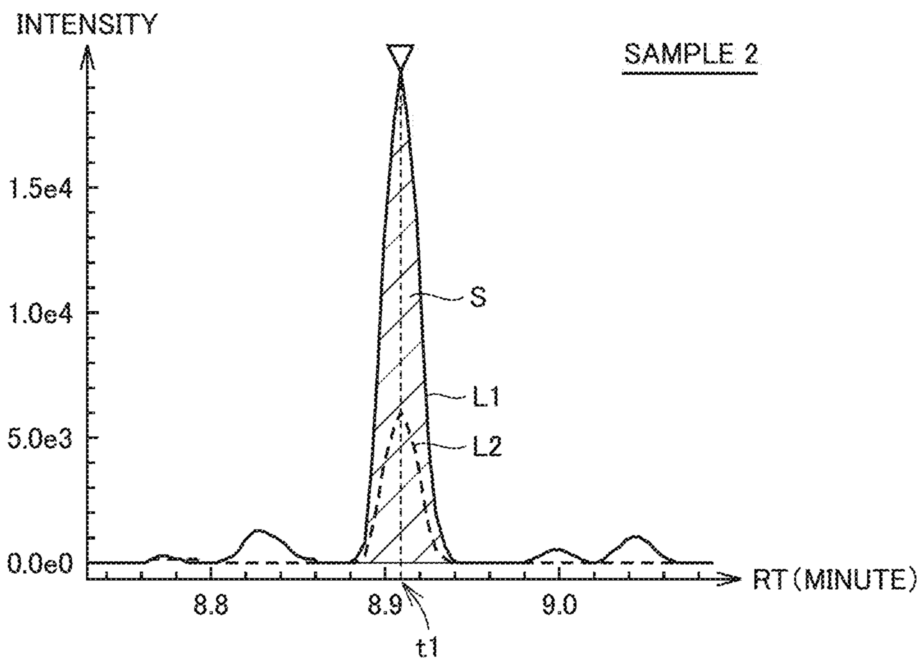
FIG. 18 is a second diagram for illustrating Rule 1 and Rule 2.
Figure 19:
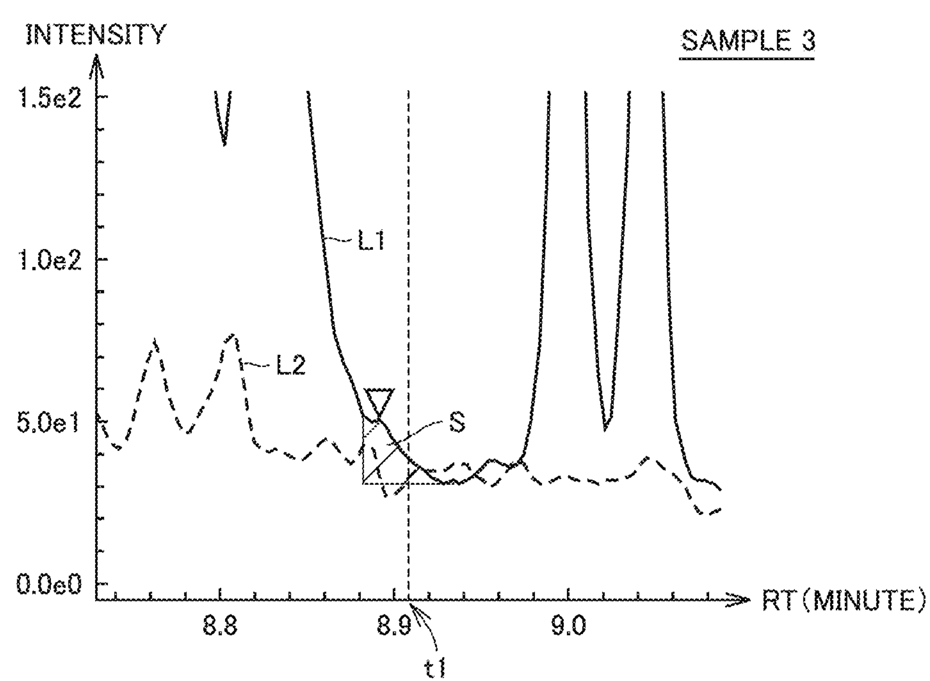
FIG. 19 is a third diagram for illustrating Rule 1 and Rule 2.

FIGS. 17 to 19 are diagrams for illustrating Rule 1 and Rule 2. FIGS. 17 to 19 each show peak data near a predicted retention time t1 in chromatograms of Sample 1 to Sample 3. In each figure, lines L1 and L2 represent data of quantitation ions and confirmation ions and a region S represents a peak area of the quantitation ions.

Referring to FIG. 17, Sample 1 satisfies Rule 1. Therefore, the peak is detected as the peak corresponding to retention time t1. Referring to FIG. 18, since Sample 2 also satisfies Rule 1, the peak is detected as the peak corresponding to retention time t1.

Referring to FIG. 19, though Sample 3 does not satisfy Rule 1, the peak corresponding to retention time t1 was detected in Sample 1 and Sample 2. Therefore, the peak close to predicted retention time t1 was detected in Sample 3.

Figure 20:
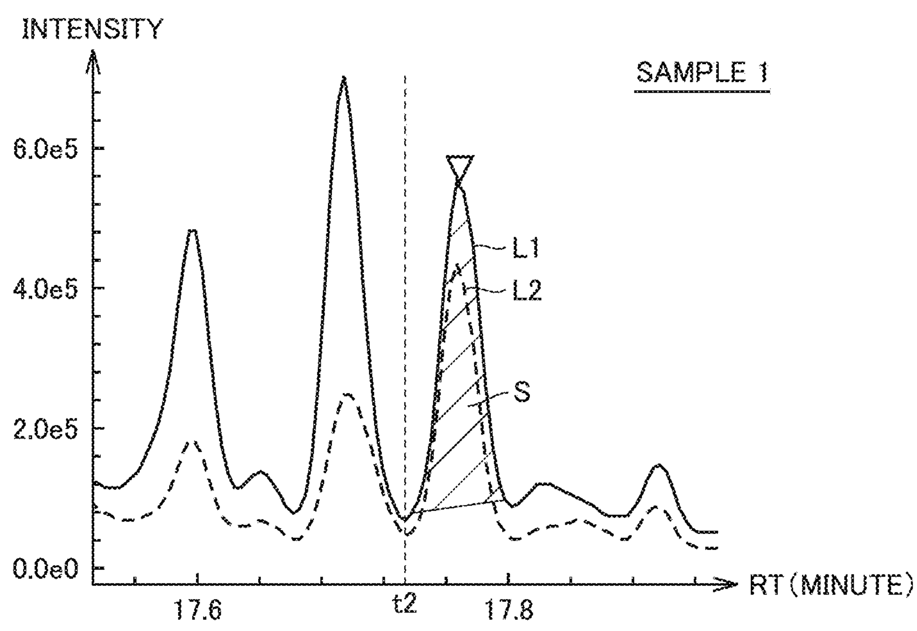
FIG. 20 is a first diagram for illustrating Rule 3.
Figure 21:
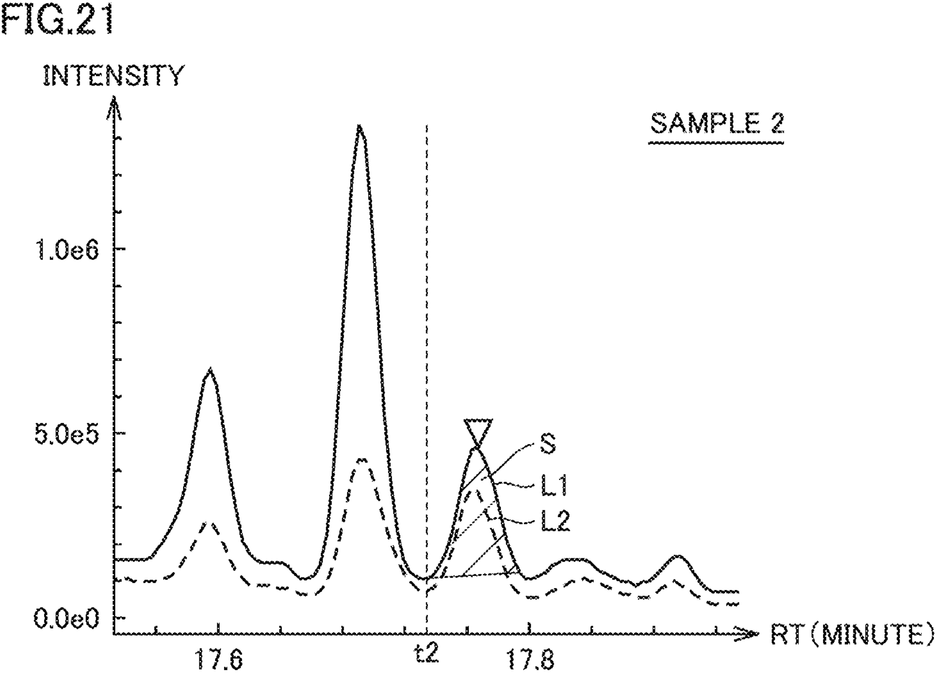
FIG. 21 is a second diagram for illustrating Rule 3.
Figure 22:
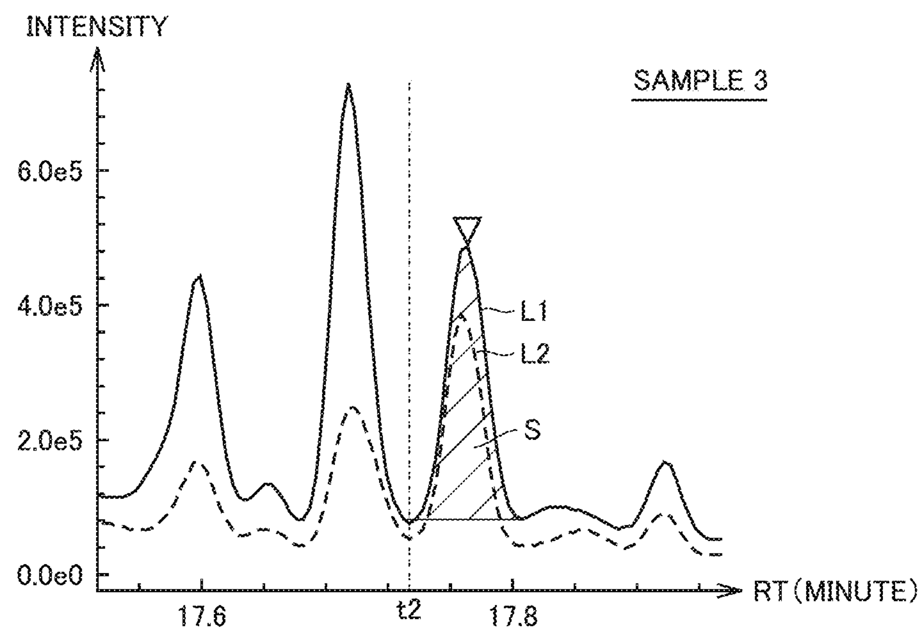
FIG. 22 is a third diagram for illustrating Rule 3.

FIGS. 20 to 22 are diagrams for illustrating Rule 3. FIGS. 20 to 22 each show peak data near a predicted retention time t2 in chromatograms of Sample 1 to Sample 3. In each figure, lines L1 and L2 represent data of quantitation ions and confirmation ions and region S represents a peak area of the quantitation ions.

Referring to FIG. 20, in Sample 1, two peaks are present within a range of predicted retention time t2±0.08 minute. The peak on the right of retention time t2 is closer to retention time t2 than the peak on the left. Therefore, the peak on the right is detected as the peak corresponding to retention time t2 (Rule 3).

Referring to FIG. 21, two peaks are present within the range of predicted retention time t2±0.08 minute also in Sample 2. The peak on the right of retention time t2 is closer to retention time t2 than the peak on the left. Therefore, the peak on the right is detected as the peak corresponding to retention time t2 (Rule 3).

Referring to FIG. 22, two peaks are present within the range of predicted retention time t2±0.08 minute also in Sample 3. The peak on the left of retention time t2 is closer to retention time t2 than the peak on the right. The peak on the right of retention time t2, however, was detected as the peak corresponding to retention time t2 in Sample 1 and Sample 2. Therefore, the peak on the right is detected as the peak corresponding to retention time t2 also in Sample 3 (Rule 3).

Many peaks with stable shapes were obtained at this time by GC-MS/MS measurement, enabling detection of a large number of peaks (total of 217 components).

After peak detection work for each sample under the rule above, an initial dataset including 106 samples×217 peaks (features) was prepared as the dataset for all samples. Then, preprocessing (FIG. 4) was performed on this initial dataset with the use of training data generation apparatus 10 (FIG. 1) described in the embodiment above to generate a training dataset. Peak detection processing under the rule above can also be concluded as preprocessing for generating training data.

Since no data rows containing missing values existed in the initial dataset as a result of peak detection based on the above-mentioned rules, there is no data deleted in missing value processing (step S20 in FIG. 4).

Samples in which the peak of the internal standard was not more than the standard value were regarded as anomalies caused by the derivatization process and were deleted from the feature data map. For all other samples, values obtained by dividing respective peak area values by a peak area value of the internal standard were normalized by the z-score and used as data.

After randomly dividing data of all remaining samples into training data and test data, 217 components (features) for which peaks were detected were subjected to preprocessing by training data generation apparatus 10 to extract thirteen components (features) effective for determination.

In present Example 2, a model for determination of the geographical origin of asparagus was created with those thirteen features by using a Random Forest training algorithm.

Figure 23:
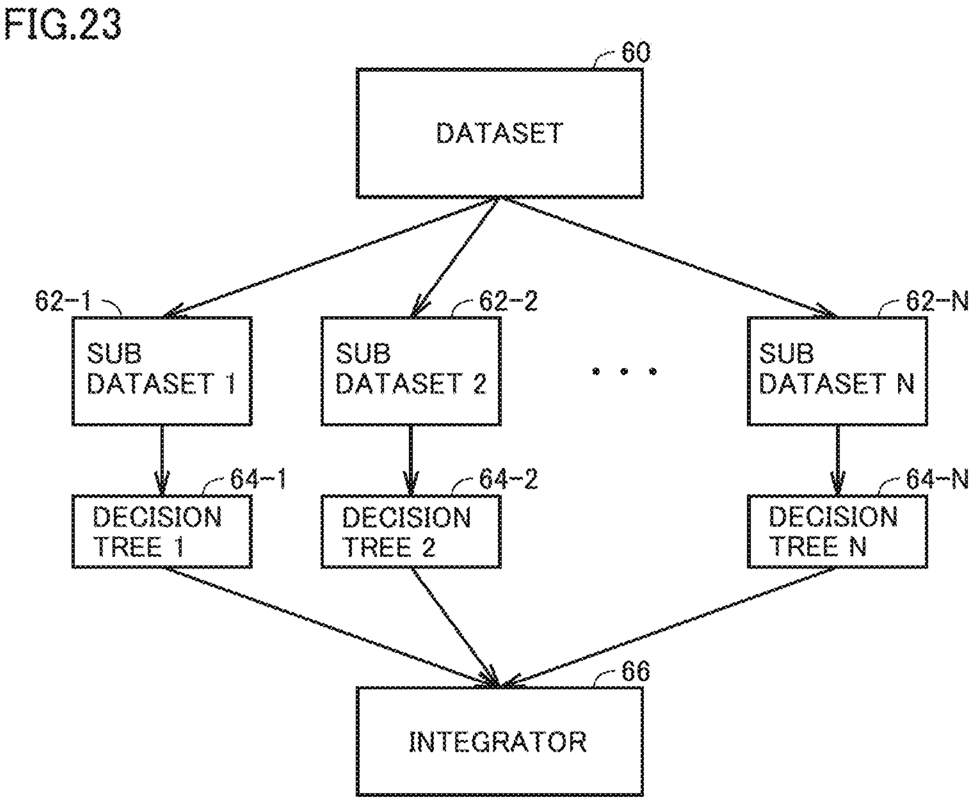
FIG. 23 is a diagram illustrating a Random Forest training algorithm.

FIG. 23 is a diagram illustrating a Random Forest training algorithm.

Referring to FIG. 23, in Random Forest, data was randomly sampled from an original dataset 60 to create N sub datasets 62-1 to 62-N. Then, decision tree models 64-1 to 64-N were created for sub datasets 62-1 to 62-N, respectively, and prediction was made in each of created decision tree models 64-1 to 64-N.

Results of prediction in decision tree models 64-1 to 64-N were integrated in an integrator 66, and final prediction was made based on majority rule among the results of prediction in the decision tree models.

In this Example 2, an operation in which the training data and the test data in the samples were randomly replaced was carried out 50 times to create fifty sub datasets to generate a Random Forest model.

Figure 24:
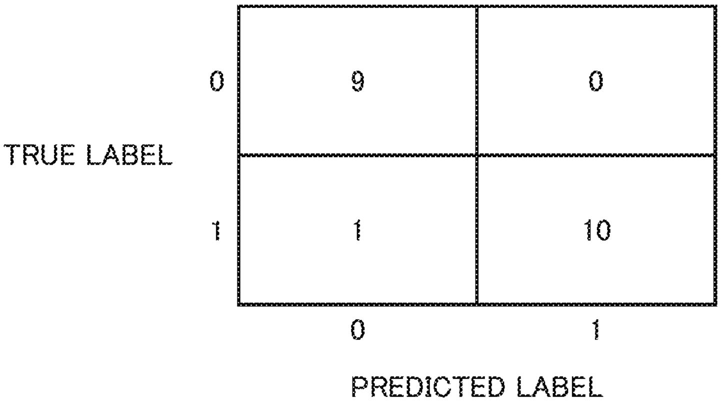
FIG. 24 is a diagram showing a confusion matrix showing a result of evaluation of a model created in Example 2.
Figure 25:
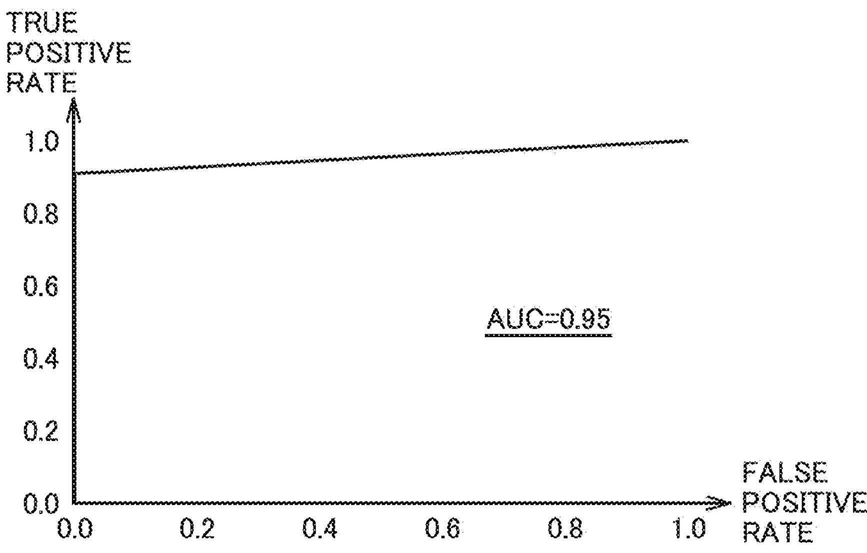
FIG. 25 is a diagram showing an ROC curve.

When predictive accuracy was calculated by applying the finally generated models (trained models), average model accuracy was 91.7%. FIG. 24 shows a confusion matrix showing a result of evaluation of the generated trained model and FIG. 25 shows an ROC curve. Referring to FIG. 25, in this example, an area under curve (AUC) of the ROC curve was 0.95 and the geographical origin of asparagus could satisfactorily be determined.

Other than Examples 1 and 2 above, preprocessing described in the present disclosure is also applicable, for example, to preprocessing for machine learning described in US Patent Publications Nos. 2007/0176088, 2008/0095428, 2010/0070438, 2016/0321561, 2007/0213000, and 2019/0130994.

[Aspects]

An illustrative embodiment described above is understood by a person skilled in the art as specific examples of aspects below.

(Clause 1) A training data generation apparatus according to one aspect is a training data generation apparatus to be used for generation of a training model. The training model is generated through machine learning processing from data in which peak information representing a result of mass spectrometry of a sample and characteristic information representing a prescribed characteristic of the sample are associated with each other. The training data generation apparatus includes an obtaining unit that obtains the peak information and the characteristic information for each sample from a plurality of samples and a processor that performs processing for generating training data by processing a plurality of pieces of peak information obtained by the obtaining unit. The processor deletes data on a peak missing in any of the plurality of pieces of peak information from each of the plurality of pieces of peak information, further deletes, when a coefficient of correlation of data between peaks among remaining peaks is equal to or larger than a prescribed value, data on one peak of the peaks from each of the plurality of pieces of peak information, and defines the peak information including data on the remaining peaks as input data for data for learning.

According to the training data generation apparatus, training data from which an unnecessary peak (feature) has been reduced is generated. Therefore, accuracy of the generated trained model is improved and efficiency in training of the model is also improved.

(Clause 2) In the training data generation apparatus described in Clause 1, the processor further deletes data on a peak with an outlier in data distribution of the plurality of samples from each of the plurality of pieces of peak information.

According to such a configuration, accuracy of the trained model and efficiency in training of the model can further be improved.

(Clause 3) A model training apparatus according to one aspect includes a model generator that generates a training model by performing machine learning processing with the training data generated by the training data generation apparatus described in Clause 1 or 2 and a model storage in which the trained model generated by the model generator is stored.

According to the model training apparatus, machine learning processing is performed with the use of training data generated by the training data generation apparatus. Therefore, accuracy of the generated trained model is improved and efficiency in training of the model is also improved.

(Clause 4) A sample characteristic estimation apparatus according to one aspect includes an obtaining unit that obtains peak information representing a result of mass spectrometry of a sample and an estimator that estimates a prescribed characteristic of the sample by entering the peak information into a trained model. The trained model is generated by performing machine learning processing with training data generated by performing preprocessing on a plurality of pieces of peak information obtained from a plurality of samples. The preprocessing includes processing for deleting data on a peak missing in any of the plurality of pieces of peak information from each of the plurality of pieces of peak information, processing for further deleting, when a coefficient of correlation of data between peaks among remaining peaks is equal to or larger than a prescribed value, data on one peak of the peaks from each of the plurality of pieces of peak information, and processing for defining the peak information including data on the remaining peaks as input data for data for learning.

According to this sample characteristic estimation apparatus, a characteristic of a sample is estimated based on the model (trained model) generated with the use of training data from which the unnecessary peak (feature) has been reduced. Therefore, the characteristic of the sample can highly accurately be estimated.

(Clause 5) A chromatograph mass spectrometry apparatus according to one aspect includes a chromatograph, a mass spectrometer that performs mass spectrometry based on a result of analysis by the chromatograph, and the characteristic estimation apparatus according to Clause 4 that estimates a prescribed characteristic of a sample based on peak information representing a result of mass spectrometry by the mass spectrometer.

Since the chromatograph mass spectrometry apparatus includes the characteristic estimation apparatus described above, the characteristic of the sample can highly accurately be estimated.

Though an embodiment of the present invention has been described, it should be understood that the embodiment disclosed herein is illustrative and non-restrictive in every respect. The scope of the present invention is defined by the terms of the claims and is intended to include any modifications within the scope and meaning equivalent to the terms of the claims.

What is claimed is:

1. An apparatus for food freshness detection, comprising:

a chromatograph mass spectrometry apparatus that obtains a plurality of samples of food, and measures a plurality of pieces of peak information for the plurality of samples by applying gas chromatography mass spectrometry (GCMS) to the plurality of samples, the plurality of pieces of peak information representing results of mass spectrometry of the plurality of samples; and a processor configured to:

obtain the plurality of pieces of peak information and a plurality of pieces of characteristic information associated with the plurality of samples, wherein the plurality of pieces of characteristic information is assigned based on indicators of freshness for the plurality of samples, delete data on at least one peak from any of the plurality of pieces of peak information whose peak intensity is lower than a prescribed threshold value, further delete, when a coefficient of correlation of data between peaks among remaining peaks is equal to or larger than a prescribed value, data on one peak of the peaks from each of the plurality of pieces of peak information, configure a feature data map as a N×(M+1) table, wherein N rows correspond to the plurality of samples, M columns correspond to peak intensities at the remaining peaks, and a last column represents labels indicating the plurality of pieces of characteristic information, and output the peak intensities in the feature data map as training data to a model generator provided in or operatively connected to a chromatograph mass spectrometry apparatus;

wherein the processor is further configured to:

train a model using the training data;

input, into the trained model, peak data corresponding to features of new set of samples; and determines, for the new set of samples, using the trained model, a classification indicating freshness of the new set of samples.

2. The apparatus according to claim 1, wherein the processor further deletes data on a peak with an outlier in data distribution of the plurality of samples from the plurality of pieces of peak information.

3. A model training apparatus comprising:

the model generator that generates the model by performing machine learning processing with the training data generated by the apparatus according to claim 1; and a model storage in which the model generated by the model generator is stored.

4. A model training apparatus comprising:

the model generator that generates the model by performing machine learning processing with the training data generated by the apparatus according to claim 2; and a model storage in which the model generated by the model generator is stored.

5. The apparatus according to claim 1, wherein the chromatograph mass spectrometry apparatus comprises:

a chromatograph; and a mass spectrometer that performs mass spectrometry based on a result of analysis by the chromatograph.

* * * * *